Dec. 20, 1938.                J. WELLER                    2,141,118
                     TENSIONING DEVICE FOR CHAINS
                        Filed Aug. 6, 1937           2 Sheets-Sheet 1
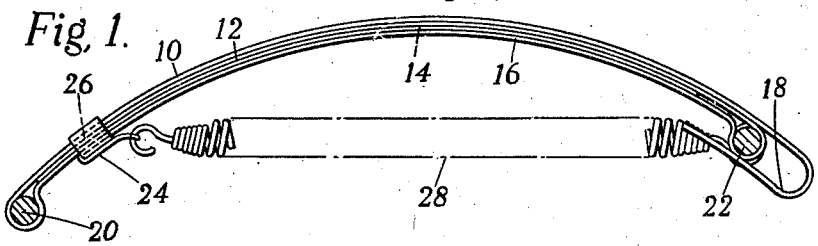
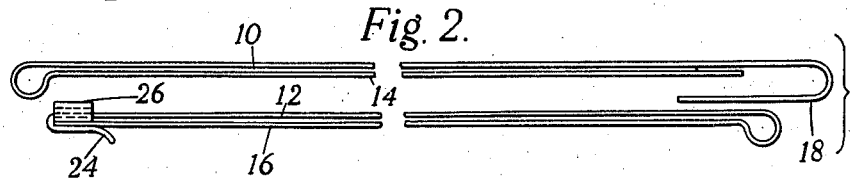
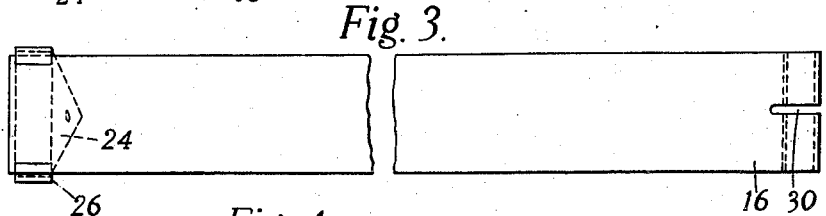
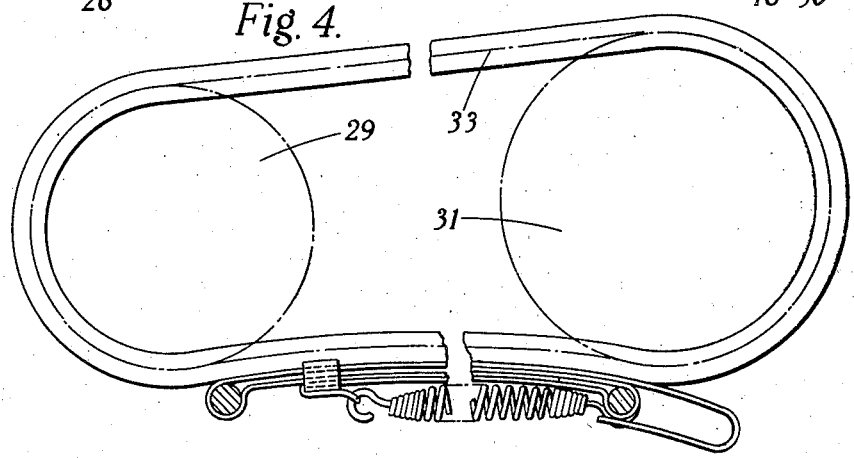
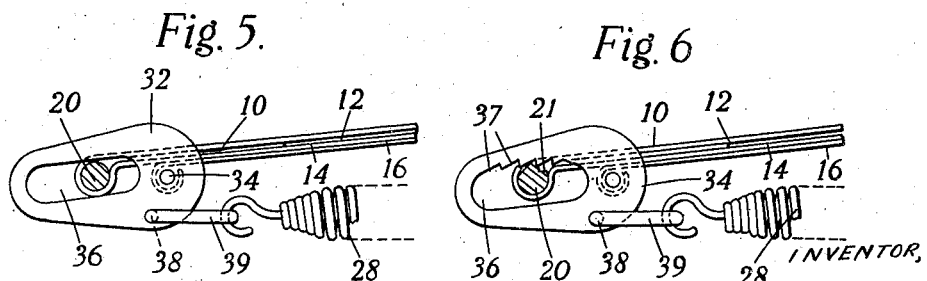
INVENTOR,
John Weller,
By Frank S. Ackerman
ATTORNEY Dec. 20, 1938.  J. WELLER  2,141,118

TENSIONING DEVICE FOR CHAINS

Filed Aug. 6, 1937  2 Sheets-Sheet 2

INVENTOR,
John Weller,
BY
Frank S. Appleman
ATTORNEY.

Patented Dec. 20, 1938

2,141,118

UNITED STATES PATENT OFFICE 2,141,118

TENSIONING DEVICE FOR CHAINS

John Weller, West Horsley, England

Application August 6, 1937, Serial No. 157,811
In Great Britain December 13, 1935

3 Claims. (Cl. 74—242.11)

This invention relates to tensioning device for transmission chains and the like of the kind comprising a slipper in the form of a leaf spring bearing resiliently against a free length of the chain so as to take up slack in the chain. One object of the invention is to provide a simple form of device of this kind of which the damping effect on its own movements is improved.

According to the present invention a tensioning device for transmission chains and the like comprises a laminated leaf spring having one or more leaves anchored at one end and one or more other leaves anchored at the opposite end, the anchorages being fixed or constrained, so that as the spring is flexed its leaves slide over one another throughout their lengths, thereby damping the movement frictionally.

Convenient means is provided to urge the free end portion of at least one leaf towards the opposite end of the spring. For example a tension spring or other resilient tension device may be connected between opposite ends of one or more of one set of leaves. Alternatively, a tension device may be connected between the free end portions of one or more of one set of leaves and the free end portions of one or more of the other set of leaves. The phrase "set of leaves" is intended to mean the leaves having a common anchorage and is not intended to exclude a single leaf.

In the accompanying drawings,

Figure 1 is a side view of a leaf-spring chain-tensioner according to this invention, Figure 2 is a view of the component parts of the spring shown in Figure 1 separated from one another.

Figure 3 is a view of one of the parts shown in Figure 2 from underneath,

Figure 4 is a view similar to Figure 1 showing the tensioner co-operating with a transmission chain, Figures 5, 6 and 7 are fragmentary views of two alternative arrangements.

Figure 7:
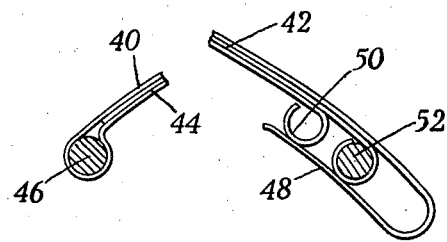

The device shown in Figures 1 to 4, as will be clear from Figure 2, is composed of four leaves 10, 12, 14 and 16, of which the leaves 10 and 14 are formed integral with one another, being bent to pass round an anchor pin 20 at their left-hand end, whilst the leaves 12 and 16 are also integral and are formed to pass round an anchor pin 22 at their right-hand end. When assembled the leaf 12 fits between the leaves 10 and 14 and the leaf 14 between the leaves 12 and 16.

Preferably means is also provided for preventing the free end of the outermost leaf 10 from springing away from the remaining leaves and for this purpose its end may be bent round as shown at 18 so as to embrace the pivot 22 and surrounding portion of the leaves 12 and 16.

The leaves of the spring are initially straight and they are bent to the shape shown in Figure 1 by a tension spring or other resilient tension device connected to the free end of one or more of one set of leaves so as to urge it towards the anchorage at the opposite end. In the form shown in Figures 1 to 4, the left-hand end of the innermost leaf 16 carries a clip 24 to which one end of a coil spring 28 is attached. The other end of the spring passes round the anchor pin 22 and for this purpose a slot 30 is provided in the spring. The clip is generally U-shaped and fits over the end of the leaf 16 and is provided with lateral lugs 26 which embrace the sides of the remaining leaves to hold the leaves together and especially to prevent the free end of the innermost leaf 16 from being pulled away from the remainder.

Instead of a single coil spring 28, two such springs may be used one on either side of the leaf spring. When a single spring 28 is employed the bent-round portion 18 is slotted to clear it.

The spring is mounted with the outermost leaf 10 bearing directly against the chain to be tensioned, generally, though not necessarily, on the unloaded side thereof, as shown in Figure 4 in which two chain wheels 29, 31 are geared together by the chain 33. It will be appreciated that the two sets of leaves slide upon one another as their curvature changes, the consequent friction exerting a damping action on the transverse movement of the chain.

It will be appreciated that since the spring 28 is connected to what will be the innermost leaf, its tendency is to force that leaf to bow outwardly into firmer contact with the remaining leaves and hence to increase the friction between them. Strips of friction material may be interposed between the leaves to increase the friction still further.

Figure 5 shows an alternative arrangement for the left-hand attachment of the spring 28. In this arrangement the leaves may be similar to those of Figures 1 to 3 and are marked by similar reference numerals. Thus the leaves 10 and 14 are integral with one another and pass round the left-hand anchor pin 20. The left-hand end of the leaf 16, however, instead of carrying a clip, is bent round and pivotally connected at 34 to a pair of plates 32 which in effect constitute a kind of bell crank. The plates have slots 36 in which the anchor pin 20 can slide and the left-hand end of the spring 28 is connected to the plates at 38 by a link 39.

As will be clear from the drawings, the arrangement is such that the spring 28 tends to rock the plates 32 in an anti-clockwise direction and the effect of this is to force the lowest leaf 16 upwardly into contact with the remaining leaves. As the curvature of the spring increases the tension of the spring 28 will decrease and this effect will therefore be reduced. In addition it is possible to arrange the parts so that the line of action of the spring 28 more nearly passes through the pivot 34 and hence the turning moment of the spring will be further reduced.

It will be appreciated that when the leaves are substantially straight the amount of relative sliding between them is a minimum, and as their curvature increases so the sliding movement also increases. Thus, if the damping is to remain more or less constant, the pressure between the leaves must decrease as the curvature increases and the tendency of the arrangement shown in Figure 5 is to ensure this.

Whilst in the drawings the spring 28 is shown as connected at its right-hand end to the anchorage 22 the arrangement may be modified by connecting each end of the spring 28 to the free ends of one set of leaves, one set of free ends being at one end of the spring and the other set at the other. For example the right-hand end of the spring 28 may be connected to the turned-round end 18 of the leaf 10.

Figure 6 illustrates a modification of the arrangement shown in Figure 5. As will be appreciated, the tension in the spring 28 tends to press the upper edge of the slot 36 resiliently against the pin 20. In Figure 6, this edge of the slot is formed with ratchet teeth 37 and the pin 20 is shaped to provide a pawl 21 co-operating with the ratchet teeth. The pawl and the teeth permit the spring leaves 10, 12, 14, 16 to move upwards so as to take up the increasing slack in the chain as it stretches, but prevent movement in the reverse direction.

The invention is not limited to any particular number of leaves and Figure 7 shows an arrangement in which only three leaves are employed, the phrase "set of leaves" used herein being intended not to exclude a single leaf. In this arrangement the two outer leaves 40 and 44 are formed integral with one another and pass round an anchor pin 46 at their left-hand end, whilst the intermediate leaf 42 passes round an anchor pin 52 at its right-hand end. Figure 7 also shows the outer leaf 40 bent round as shown at 48 so as to bear against the curled end 50 of the inner leaf 44 so as to prevent the free end of the outer leaf springing outwardly or that of the inner leaf springing inwardly.

The resilient tension device serving to urge the free end portions of the selected leaves towards the opposite end of the spring need not necessarily consist of a simple tension spring but might for example include a compression spring acting through a suitable linkage.

Where a resilient tension device such as the spring 28 is provided the leaves may be formed so that they are initially straight, as already stated, but if an inner leaf is initially curved so as to be convex towards the remainder the pressure, and hence the friction, between the leaves will be increased.

Figure 8:
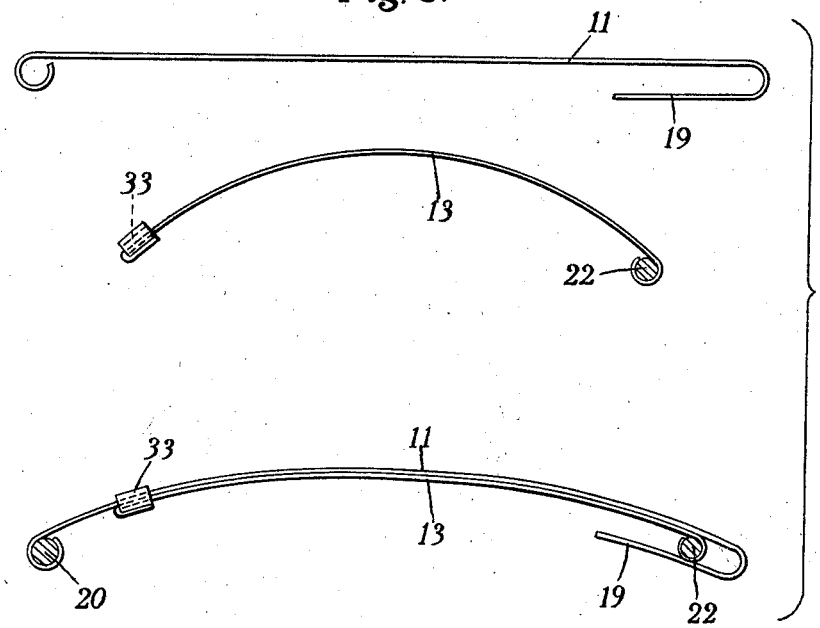
Figure 8 is a view similar to Figure 1 showing yet another alternative arrangement.

In the embodiment shown in Figure 8 the spring 28 is dispensed with and two leaves 11, 13 only are employed. The upper leaf 11 which bears against the chain is initially straight and the lower leaf 13 is initially curved as shown to a greater curvature than that required in the complete spring. The left-hand end of the leaf 11 is anchored to the pin 20 and its right-hand end is bent back upon itself as at 19, this bent-back portion being hooked under the pin 22. The right-hand end of the leaf 13 is anchored to the pin 22 and its left-hand end is provided with a clip 33 by which it is held in contact with the leaf 11. This clip 33 is similar to the clip 26 described with reference to Figures 1 to 4.

As will readily be appreciated, the leaf 13 will press upwards against the leaf 11, bending it to the curvature shown in the lower part of the figure, and the two leaves will slide upon one another as the curvature changes in consequence of transverse movements of the chain, thereby damping such movements.

I claim:—

1. A tensioning device for transmission chains and the like comprising a laminated spring consisting of two sets of leaves and two anchorages therefor one at each end of the spring, one of said sets of leaves being anchored at one end to one of said anchorages, one of the leaves of said set of leaves at the other end thereof being bent back upon itself and slidably engaging the other of said anchorages, and the other of said sets of leaves being anchored at one end to the other of said anchorages, the leaves of one set being interleaved with those of the other set.

2. In a tensioning device for transmission chains and the like, a laminated leaf spring consisting of at least two leaves, anchorages therefor at each end of the spring, one of said leaves being anchored at one end to one of said anchorages, means at the other end of said leaf slidably engaging the other anchorage, the other of said leaves being anchored at one end to the other of said anchorages and means at the other end of said second leaf slidable on said first leaf, and tension means connected to one of the anchorages and to one of said leaves whereby the leaves are arcuately shaped.

3. In a tensioning device for transmission chains and the like, a laminated leaf spring consisting of two sets of leaves, anchorages for said spring at each end thereof, one of said sets of leaves being anchored at one end to one of said anchorages, means at the other end of said set slidably engaging said other anchorage, the other of said sets of leaves being anchored at one end to the other of said anchorages, means at the other end of said second set slidable on said first set, the leaves of one set being interleaved with those of the other set, and tension means connected to one of the anchorages and to one of said leaves whereby the leaves are urged toward an opposite anchorage.

JOHN WELLER.